(12) United States Patent
Tsukada et al.

(10) Patent No.: US 10,507,455 B2
(45) Date of Patent: Dec. 17, 2019

(54) PHOTOCATALYST, AND METHOD FOR PRODUCING PHOTOCATALYST

(71) Applicant: FUJITSU LIMITED, Kawasaki-shi, Kanagawa (JP)

(72) Inventors: Mineharu Tsukada, Hadano (JP); Florence Nawalage Cooray, Kelaniya (LK); Toshihisa Anazawa, Sagamihara (JP); Masato Wakamura, Sakai (JP)

(73) Assignee: FUJITSU LIMITED, Kawasaki (JP)

( * ) Notice: Subject to any disclaimer, the term of this patent is extended or adjusted under 35 U.S.C. 154(b) by 765 days.

(21) Appl. No.: 14/704,203

(22) Filed: May 5, 2015

(65) Prior Publication Data

US 2015/0231606 A1 Aug. 20, 2015

Related U.S. Application Data

(63) Continuation of application No. PCT/JP2012/079678, filed on Nov. 15, 2012.

(51) Int. Cl.
*B01J 23/68* (2006.01)
*B01J 23/22* (2006.01)
(Continued)

(52) U.S. Cl.
CPC .......... *B01J 23/682* (2013.01); *B01J 23/002* (2013.01); *B01J 23/22* (2013.01); *B01J 23/68* (2013.01);
(Continued)

(58) Field of Classification Search
CPC . B01J 23/68; B01J 23/682; B01J 23/22; B01J 35/00; B01J 35/004; B01J 37/04;
(Continued)

(56) References Cited

U.S. PATENT DOCUMENTS

2003/0219624 A1 11/2003 Aso
2005/0096408 A1 5/2005 Wakamura
(Continued)

FOREIGN PATENT DOCUMENTS

CN 1628160 A 6/2005
EP 2545992 A1 1/2013
(Continued)

OTHER PUBLICATIONS

Wakamura, (CN1628160 A, see machine translation).*
(Continued)

*Primary Examiner* — Melvin C. Mayes
*Assistant Examiner* — Smita S Patel
(74) *Attorney, Agent, or Firm* — Kratz, Quintos & Hanson, LLP

(57) ABSTRACT

A photocatalyst, represented by the following general formula (1):

$$X(VO_4)_6(OH)_2 \quad \text{General Formula (1)}$$

wherein X represents $Z_{a1}Ti_{b1}$ or $Z_{a2}Ti_{b2}Ag_{c2}$ (where Z is Ca or Sr; a1 is 7.0 to 9.5; b1 is 0.5 to 3.0; a2 is 7.0 to 9.5; b2 is 0.4 to 1.5; c2 is 0.1 to 2.0; a1+b1 is 9.0 to 10.0; and a2+b2+c2 is 9.0 to 10.0) in the general formula (1).

3 Claims, 3 Drawing Sheets

(51) Int. Cl.
    *B01J 35/00*     (2006.01)
    *B01J 37/03*     (2006.01)
    *B01J 23/00*     (2006.01)
    *B01J 37/04*     (2006.01)
    *B01J 27/18*     (2006.01)

(52) U.S. Cl.
    CPC .......... *B01J 35/002* (2013.01); *B01J 35/004* (2013.01); *B01J 37/03* (2013.01); *B01J 37/04* (2013.01); *B01J 27/1806* (2013.01); *B01J 2523/00* (2013.01)

(58) Field of Classification Search
    CPC ................ B01J 2523/47; B01J 2523/00; B01J 2523/24; B01J 2523/55; B01J 2523/18; B01J 2523/23
    See application file for complete search history.

(56) References Cited

U.S. PATENT DOCUMENTS

| | | |
|---|---|---|
| 2006/0199729 A1 | 9/2006 | Naganuma |
| 2007/0148424 A1* | 6/2007 | Toyoda .................. B01J 35/004 428/292.1 |

FOREIGN PATENT DOCUMENTS

| | | |
|---|---|---|
| JP | H11-195345 | 7/1999 |
| JP | 2000-327315 | 11/2000 |
| JP | 2001-302220 A1 | 10/2001 |
| JP | 2002-306963 A1 | 10/2002 |
| JP | 2003-80078 A1 | 3/2003 |
| JP | 2003-175338 A1 | 6/2003 |
| JP | 2003-305371 A1 | 10/2003 |
| JP | 2003-321313 A1 | 11/2003 |
| JP | 2003-334883 A1 | 11/2003 |
| JP | 2006-239514 A1 | 9/2006 |
| JP | 2011-206766 A1 | 10/2011 |
| WO | WO 2005/063392 A1 | 7/2005 |
| WO | 2011111800 A1 | 9/2011 |

OTHER PUBLICATIONS

Gupta et al NPL: ("Physico-chemicals aspects of calcium vanadate apatite", Journal of Materials Science, 21 (1986) pp. 161-164).*

International Search Report for International Application No. PCT/JP2012/079678 dated Dec. 11, 2012.

International Written Opinion for International Application No. PCT/JP2012/079678 dated Dec. 11, 2012 (3 Sheets).

Extended European Search Report dated Oct. 28, 2015, issued for the corresponding EP application No. 12888335.2.

M. Sandhyarani et al., "Photocatalytic and Antibacterial Activity of Titanium, Flourine and Silver Co-Substituted Hydroxyapatite" International Journal of Modern Physics: Conference Series, vol. 22, Jan. 1, 2013, pp. 268-277.

Office Action of CN Patent Application No. 201280076885.2 dated Jan. 8, 2016, with full translation of the Office Action.

Wang Min, et al., "Synthesis and photocatalytic property of Ag+/FeVO4 photocatalyst", Journal of Functional Materials, vol. 41, No. 2, 2010, pp. 228-230.

\* cited by examiner

PHOTOCATALYST, AND METHOD FOR PRODUCING PHOTOCATALYST

CROSS-REFERENCE TO RELATED APPLICATION

This application is a continuation application of International Application PCT/JP2012/079678 filed on Nov. 15, 2012 and designated the U.S., the entire contents of which are incorporated herein by reference.

FIELD

The embodiments discussed herein relate to a photocatalyst, and a method for producing a photocatalyst.

BACKGROUND

Recently, photocatalystic activities of some of semiconductor materials, such as titanium oxide ($TiO_2$), which exhibit an oxidation decomposition function, an antibacterial action, and an antifouling function, have been attracted attentions. In the semiconductor material having the photocatalystic activities as above, typically, electrons present on the valence band are sifted to the conduction band, as light having the energy corresponding to a band gap between the valence band and the conduction band is absorbed. The electrons sifted to the conduction band have characteristics that the electrons move to a material adsorbed on a surface of the semiconductor material having the photocatalystic activities. In the case where a material is adsorbed on a surface of the semiconductor material, therefore, the material is reduced with the electrons. Meanwhile, holes are generated on the valence band, as electrons presented on the valence hand are sifted to the conduction band. Then, the holes generated on the valence band have characteristics that the holes take electrons out from a material adsorbed on a surface of the semiconductor material having photocatalystic activities. In the case where a material is adsorbed on a surface of the semiconductor material, the holes take electrons out of the material to thereby oxidize the material.

The aforementioned phenomenon is specifically explained. Taking titanium oxide having particularly excellent photocatalystic activities as an example, electrons present on a valence band of the titanium oxide are sifted to a conduction band thereof, once titanium oxide absorbs light having energy corresponding to a band gap between the balance band and conduction band thereof. The electrons sifted to the conduction band reduce oxygen in the air to generate super oxide anions ($.O_2^-$). Meanwhile, holes are generated on the valence band as a result of the shift of the electrons. The holes generated on the valence band oxidize water adsorbed on a surface of the titanium oxide, to generate hydroxyl radicals (.OH). Since the hydroxyl radicals have extremely strong oxidizability, in the case where organic matter is adsorbed on the surface of the titanium oxide, the organic matter is decomposed by the function of the hydroxyl radicals. Ultimately, the organic matter is decomposed down to water and carbon dioxide. When light having energy corresponding to a band gap of a semiconductor material between a valence band thereof and a conduction band thereof is applied to the semiconductor material having photocatalyst activities, such as titanium oxide, as mentioned above, the semiconductor material absorbs the light, and organic matter adsorbed on a surface of the semiconductor material is decomposed. As a result, an oxide decomposition function, antibacterial action, and an antifouling function are exhibited.

Therefore, the semiconductor material having photocatalyst activities, including especially titanium oxide, has been recently widely used, as an antibacterial agent, sterilizer, antifouling agent, deodorant, or environmental cleaning agent. For example, disclosed is to provide antibacterial activities to a press bottom of electronic equipment with adhering photocatalystic titanium oxide onto the press bottom (see, for example, Japanese Patent Application Laid-Open (JP-A) No. 11-195345). Moreover, disclosed are a photocatalyst thin film containing particles having photocatalystic action, which is formed of a metal element that has an electronegativity smaller than 1.6, is an element having an ion radius smaller than 0.2 nm, and has an atomic value of 2 or smaller, and a product having the photocatalyst thin film on a surface of a base (see, for example, JP-A No. 2003-305371).

However, those disclosed above have the following problems. Light energy necessary to cause excitation of titanium oxide having excellent photocatalyst activities is 3.2 eV to 3.3 eV. As this light energy is converted into a wavelength of light, the wavelength is about 380 nm. This means that the titanium oxide cause excitation when near ultraviolet rays are applied, but the titanium oxide does not cause excitation when visible light (wavelength: 400 nm to 800 nm) is applied. A proportion of ultraviolet rays in sun light is small, i.e., just 4% to 5%. In the case where sun light is used as irradiation light, therefore, there is a problem that the titanium oxide does not exhibit sufficient photocatalyst activities. In the case where light emitted from an indoor florescent lamp, in which ultraviolet rays barely exist, is applied, moreover, there is a problem that the titanium oxide hardly exhibits photocatalyst activities.

Strongly desired is a development of titanium oxide, which can solve the aforementioned problem that sufficient photocatalyst activities cannot be provided to a product used under sun light or an indoor fluorescent lamp, and which can exhibit sufficient photocatalyst activities when visible light occupying 45% of sun light, and majority of light emitted from a fluorescent lamp is applied. Therefore, researches associated with response of the titanium oxide to visible light have been widely conducted.

As one example of the aforementioned researches, proposed are, for the purpose of providing visible light responsibility to the titanium oxide, a method where oxygen defects are formed in the titanium oxide, and a method where the titanium oxide is doped with nitrogen. In these cases, however, practically satisfactory results are not attained, and it is a current situation that they have remained within a research level.

Meanwhile, the titanium oxide has poor adsorption ability to an organic material. Therefore, it is desired to improve the adsorption ability of the titanium oxide against a decomposition target, in order to exhibit an oxidation decomposition function, an antibacterial action, and an antifouling function based on the photocatalystic activities of the titanium oxide.

As for a material having an excellent adsorption ability to a decomposition target, therefore, researches and developments of technologies using properties of apatite, such as calcium hydroxyapatite have been conducted, because apatite, such as calcium hydroxyapatite $Ca_{10}(PO_4)_6(OH)_2$, which is a main component of bio hard tissue, such as teeth, and bone, facilitates ion exchange with various cations and anions, has high biocompatibility and adsorption ability, and has a significant adsorption ability to organic matter, such as protein.

As for one example of the aforementioned researches and developments, disclosed is a product, in which a semiconductor material, such as titanium oxide, and a calcium phosphate-based compound, such as calcium hydroxyapatite, are combined to thereby effectively bring out characteristics of the both materials (see, for example, JP-A Nos. 2003-80078 and 2003-321313). Moreover, disclosed is calcium•titanium hydroxyapatite $Ca_{9(8)}Ti(PO_4)_6(OH)_2$ having a photocatalyst function, so-called photocatalyst titanium hydroxyapatite(Ti—CaHAP), which is formed by exchanging part of calcium ions in the apatite with titanium ions (see, for example, JP-A Nos. 2000-327315, 2001-302220, 2003-175338, and 2003-334883).

Even in the aforementioned photocatalyst titanium hydroxyapatite (Ti—CaHAP), however, there is the aforementioned problem that the titanium oxide hardly exhibits photocatalystic activities when light emitted from an indoor fluorescent lamp, in which ultraviolet rays barely exist, is applied.

Therefore, disclosed as a photocatalyst, which exhibits excellent absorbance to ultraviolet rays and visible light, exhibits photocatalystic activities to light of a wide wavelength range over a long period, has excellent an adsorption ability to a decomposition target, and can exhibit an oxide decomposition function, an antibacterial action, and an antifouling function, is a Ti—CaHAP photocatalyst, in which chromium (Cr) and/or nickel (Ni), and tungsten (W) and/or vanadium (V) are introduced by doping (see, for example, JP-A No. 2006-239514).

However, the disclosed photocatalyst contains an element, which may be turned into ions harmful to the environment, such as chromium (Cr), and has a problem on practical use.

Note that, in the literature above, as a metal atom constituting apatite, possible use of a metal atom, such as aluminum (Al), or lanthanum (La) is mentioned, other than calcium (Ca). As for a metal atom that can function as a center of a photocatalyst, possible use of zinc (Zn) is mentioned, other than titanium (Ti). Moreover, chromium (Cr), and nickel (Ni) are disclosed as a visible light absorbing metal atom used for doping, and only chromium (Cr), and nickel (Ni) are mentioned as a metal atom to be introduced into titanium hydroxyapatite (Ti-HAP) by doping for providing the photocatalyst with photocatalytic activities to light of a wide wavelength range, especially light including visible light. Possible use of other metal atoms has not been studied or suggested at all.

Accordingly, a current situation is that it is desired to provide a high performance photocatalyst, which does not contain a metal atom harmful for the environment, and has excellent photocatalystic activities, and to provide a production method of the photocatalyst.

SUMMARY

The disclosed photocatalyst is represented by the following general formula (1):

$$X(VO_4)_6(OH)_2 \quad \text{General Formula (1)}$$

wherein X represents $Z_{a1}Ti_{b1}$ or $Z_{a2}Ti_{b2}Ag_{c2}$ (where Z is Ca or Sr; a1 is 7.0 to 9.5; b1 is 0.5 to 3.0; a2 is 7.0 to 9.5; b2 is 0.4 to 1.5; c2 is 0.1 to 2.0; a1+b1 is 9.0 to 10.0; and a2+b2+c2 is 9.0 to 10.0) in the general formula (1).

The disclosed method for producing a photocatalyst is a production method of the disclosed photocatalyst, and contains blending a vanadium-containing compound, and a strontium ion-containing compound or a calcium ion-containing compound or both thereof, and a titanium ion-containing compound together.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Photocatalyst

The disclosed photocatalyst is represented by the following general formula (1):

$$X(VO_4)_6(OH)_2 \quad \text{General Formula (1)}$$

In the general formula (1) above, X represents $Z_{a1}Ti_{b1}$ or $Z_{a2}Ti_{b2}Ag_{c2}$ (where Z is Ca or Sr; a1 is 7.0 to 9.5; b1 is 0.5 to 3.0; a2 is 7.0 to 9.5; b2 is 0.4 to 1.5; c2 is 0.1 to 2.0; a1+b1 is 9.0 to 10.0; and a2+b2+c2 is 9.0 to 10.0).

The a1 is preferably 8.0 to 9.5, more preferably 8.5 to 9.5.

The b1 is preferably 0.5 to 2.0, more preferably 0.5 to 1.5. The aforementioned ranges are significant in terms of that the disclosed photocatalyst tends to maintain an apatite structure while having a photocatalystic function.

The a2 is preferably 7.5 to 9.0, more preferably 7.5 to 8.5.

The b2 is preferably 0.5 to 1.3, more preferably 0.6 to 1.2. The aforementioned ranges are significant in terms of that the disclosed photocatalyst tends to maintain an apatite structure while having a photocatalystic function.

The c2 is preferably 0.5 to 1.8, more preferably 0.6 to 1.5. The aforementioned ranges are significant in terms of that the disclosed photocatalyst tends to maintain an apatite structure while a photocatalystic function that the photocatalyst responds visible rays.

The a1+b1 is preferably 9.5 to 10.0. The aforementioned range is significant in terms of that an apatite structure is easily maintained.

The a2+b2+c2 is preferably 9.5 to 10.0. The aforementioned range is significant in terms of that an apatite structure is easily maintained.

Amounts of strontium, calcium, titanium, silver, and vanadium in the photocatalyst can be measured, for example, by performing a quantitative analysis using an ICP emission spectrophotometer (ICP-AES).

The photocatalyst preferably has an apatite structure represented by space group No. 176 ($P6_3/m$).

The present inventors have diligently conducted researches to provide a high performance photocatalyst, which does not contain a metal atom harmful to the environment, and has excellent photocatalystic activities. As a result, the present inventors have come to the insight that a high performance photocatalyst, which does not contain a metal atom harmful to the environment, and has excellent photocatalystic activities, is attained by replacing $PO_4$ in an apatite-based photocatalyst with $VO_4$. Moreover, a photocatalyst represented by the general formula (1), which is capable of exciting using light in a wide wavelength range, is attained.

Here, examples of a structure of the disclosed photocatalyst are illustrated in diagrams.

Figure 1:
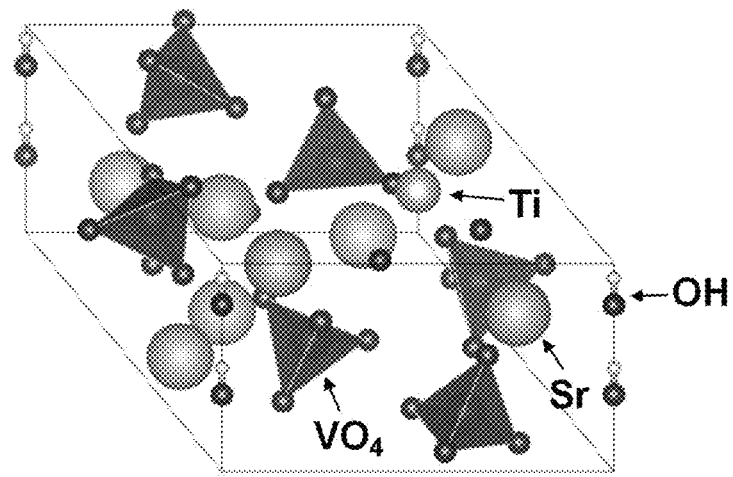
FIG. 1 is a diagram illustrating one example ($Sr_8Ti(VO_4)_6(OH)_2$) of a structure of the disclosed photocatalyst.

One example ($Sr_8Ti(VO_4)_6(OH)_2$) of a structure of the photocatalyst represented by the general formula (1) is illustrated in FIG. 1.

Figure 2:
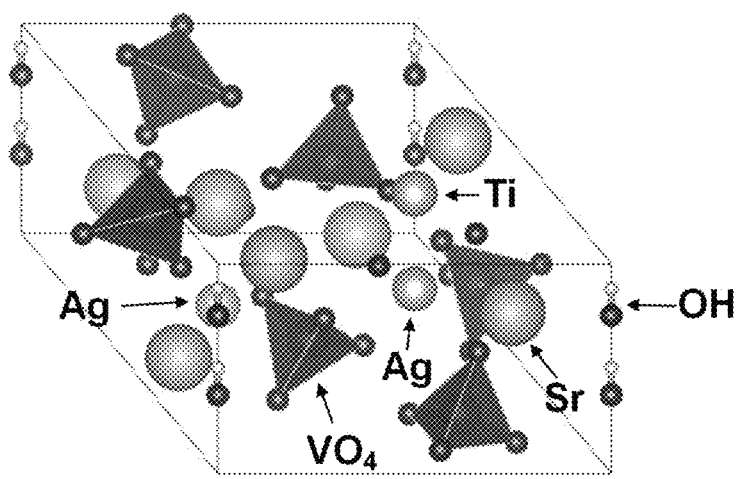
FIG. 2 is a diagram illustrating one example ($Sr_7TiAg_2(VO_4)_6(OH)_2$) of a structure of the disclosed photocatalyst.

One example ($Sr_7TiAg_2(VO_4)_6(OH)_2$) of a structure of the photocatalyst represented by the general formula (1) is illustrated in FIG. 2.

The compound having an apatite structure have excellent adsorption ability to various decomposition targets. The compound having an apatite structure have excellent adsorption ability, especially to organic matter, such as protein. In addition, the compound having an apatite structure also has excellent adsorption ability to microorganism, such as virus, mold, and bacteria, and hence an increase or growth thereof can be inhibited or suppressed.

The decomposition target is appropriately selected depending on the intended purpose without any limitation, and examples thereof include protein, amino acid, lipids, and glucide. As for the decomposition target, one of those mentioned above may be contained, or two or more thereof may be contained. Specific examples of the decomposition target include a dirt substance typically originated from human skin, garbage, dusts, sludge, unnecessary components, a waste fluid, toxic substances in the soil or the air, sludge, microorganism, and virus.

Examples of the toxic substance include acetaldehyde.

The microorganism is appropriately selected depending on the intended purpose without any limitation, and the microorganism may be prokaryotic organism, or eukaryotic organism.

Examples of the virus include DNA virus, and RNA virus. Specific examples thereof include influenza virus.

The aforementioned decomposition targets may be present in any state of a solid, a liquid, or a gas. In the case where the decomposition target is a liquid, examples thereof include a waste fluid, a nutrient solution, and a circulating fluid. In the case where the decomposition target is a gas, examples thereof include exhaust gas, and circulating gas.

The photocatalyst having an apatite structure has excellent adsorption ability more to a decomposition target than conventional metal oxide having photocatalystic activities. Accordingly, the photocatalyst is expected to have excellent decomposition ability, antibacterial action, antifouling action, and inhibition or suppression of mold or bacteria.

<Shape etc. of Photocatalyst>

A shape, structure, and size of the photocatalyst are appropriately selected depending on the intended purpose without any limitation.

Examples of the shape thereof include powdery shapes, particle shapes, pellet shapes, a rod shape, a plate shape, a block shape, a sheet shape, and a film shape. Among them, powdery shapes (a powder) is preferable in view of handling.

Examples of the structure thereof include a needle-shape structure, a plate-shape structure, a dentric structure, a corrugated sheet structure, a convexo-concave structure, a single-layer structure, a laminate structure, a porous structure, and a core-shell structure.

Note that, the determination of the photocatalyst, and observation of the embodiment thereof can be performed by means of a transmission electron microscope (TEM), X-ray diffractometer (XRD), X-ray photoelectron spectrometer (XPS), Fourier transform infrared spectrometer (FT-IR), ICP emission spectrophotometer (ICP-AES), or X-ray fluorescent spectrometer (XRF).

<Aspect of Use>

The photocatalyst may be used alone, or may be used in combination with other compounds, or may be used as slurry obtained by dispersing the photocatalyst in a liquid. In the case where the photocatalyst is used as the slurry, the liquid thereof is preferably water. The slurry can be suitably used as slurry containing the photocatalyst.

The photocatalyst may be used alone, or used as a mixture composition obtained by pulverizing the photocatalyst, and mixing the pulverized photocatalyst with another composition, or may be used as a film (surface coating) by adhering, coating, or depositing on a base. Note that, in the case where the photocatalyst is adhered, coated, or deposited on a base, a coating liquid is suitably used.

A method of the pulverizing is appropriately selected depending on the intended purpose without any limitation, and examples thereof include a method containing pulverizing using a ball mill.

The aforementioned another composition is appropriately selected depending on the intended purpose without any limitation, and examples thereof include an ink for printing.

A method of the mixing is appropriately selected depending on the intended purpose without any limitation, and examples thereof include methods using a kneading device, or a stirring device.

A material, shape, structure and thickness of the base are appropriately selected depending on the intended purpose without any limitation. Examples of the material thereof include paper, synthetic paper, woven cloth, nonwoven cloth, leather, wood, glass, metal, ceramic, and a synthetic resin. Examples of the shape thereof include a foil, a film, a sheet, and a plate.

The method of the adhering is appropriately selected depending on the intended purpose without any limitation, and examples thereof include atomizing.

The method of the coating is appropriately selected depending on the intended purpose without any limitation, and examples thereof include spray coating, curtain coating, spin coating, gravure coating, inkjet coating, and dip coating.

Examples of the method of the depositing include CVD, sputtering, and vacuum deposition.

The coating liquid is appropriately selected depending on the intended purpose without any limitation, provided that the coating liquid contains the photocatalyst. Examples thereof include a coating liquid obtained by adding an alcohol solution, which has been prepared by adding the photocatalyst to isopropyl alcohol, to an inorganic coating liquid, and mixing the mixture. The inorganic coating liquid is appropriately selected depending on the intended purpose without any limitation, and examples thereof include an inorganic coating liquid obtained by blending a cold setting inorganic coating agent (product name: S00, manufactured by Nihon Yamamura Glass Co., Ltd.) with a cold setting inorganic coating agent (Product name: UTE01, manufactured by Nihon Yamamura Glass Co., Ltd.) at a mass ratio (liquid agent of S00 (product name):liquid agent of UTE01 (product name)) of 10:1.

<Application Etc.>

The photocatalyst can be suitably used in various fields. Specifically, the photocatalyst is suitably used for OA equipment (e.g., housing of a personal computer, a mouse, and a key board), electronic equipment (e.g., a phone, a photocopier, a facsimile, various printers, a digital camera, a video camera, a CD device, a DVD device, an air conditioner, and a remote control device), electric appliance (e.g., a dish washer, a dish dryer, a tumble dryer, a washing machine, an air cleaner, a humidifier, an electric fan, a ventilation fan, a vacuum cleaner, and a kitchen waste processer), mobile information terminal (e.g., PDA, and a mobile phone), a filter (filter for gas: a filter used for an air cleaner or air conditioner, a filter for liquid: a filter used for treating a fluid used in water culture, a filter for solids: a filter used for improving soil, and a filter for a camera), wall paper, a food container (e.g., a reusable food container, and a disposal food container), medical equipment and sanitary product (e.g., a mask section of an oxygen inhaler, bandage, a mask, and antifungal gloves), textiles, such as clothing, artificial tooth, interior and exterior materials (interior and exterior materials formed of a resin, paper, cloth, ceramic, or metal; materials for a bath, a swimming pool, and building materials; materials to which light emitted from a fluorescent lamp is applied when it is handled, and ultraviolet rays are applied when it is not handled, such as a material for a medical facility, a material for a bio laboratory, and a material for a clean bench), vehicles (e.g., interior materials, and side mirrors), rings (e.g., rings used in trains, and buses), a steering wheel (e.g., steering for a bicycle, tricycle, and steering wheels for motorcycle, and automobile), a saddle (e.g., saddles for a bicycle, tricycle, and motorcycle), shoes (e.g., shoes made of cloth, resin, synthetic leather, and synthetic resin), a bag (e.g., bags made of cloth, resin, synthetic leather, and synthetic resin), a coating agent (e.g., a coating film), a sewage and waste water treating material (e.g., a material, in which a photocatalyst having absorbance to light of a wide range is blended in porous silica), a sheet (e.g., a soil treatment sheet), electrodes of a biochip (in combination with an organic dye), a mirror (e.g., a bathroom mirror, a lavatory mirror, a dental mirror, and a road mirror), a lens (e.g., spectacle lens, an optical lens, a lens for lighting, a lens for semiconductor devices, a lens for a photocopier, and a lens for a rear sensor camera for vehicle), prism, glass (e.g., window glass for buildings or watchtower; window glass for vehicle, such as automobile, trains, aircraft, ship, submersible, snowmobile, ropeway gondola, gondola for amusement parks, and space ship; windshield glass for vehicle, such as automobile, trains, aircraft, ship, submersible, snowmobile, ropeway gondola, gondola for amusement parks, and space ship; glass of a display case for frozen food, and glass of a display case for heating food, such as Chinese steamed bun), goggles (e.g., protective goggles, and sports goggles), a shield (e.g., a shield for a protective mask, shield for a sports mask, and shield of a helmet), a cover (e.g., a cover for measuring equipment, and a cover of a rear sensor camera for an automobile), a lens (e.g., a focusing lens, such as for laser dental equipment), or a cover (e.g., a cover of a laser photodetecting sensor, such as a following distance sensor, a cover of an infrared sensor, a film, a sheet, a sticker, and an emblem).

A production method of the photocatalyst is appropriately selected depending on the intended purpose without any limitation, but the photocatalyst is preferably produced by the following method for producing a photocatalyst.

According to the disclosed photocatalyst, a high performance photocatalyst, which does not contain a metal atom harmful for the environment, and has excellent photocatalystic activities, can be attained.

(Method for Producing Photocatalyst)

The disclosed method for producing a photocatalyst is a production method of the disclosed photocatalyst, and contains at least a blending step, and may further contain other steps, as necessary.

<Blending Step>

The blending step is appropriately selected depending on the intended purpose without any limitation, provided that the blending step is a step containing blending a vanadium-containing compound, and a strontium ion-containing compound or a calcium ion-containing compound or both thereof, and a titanium ion-containing compound together. It is preferred that a silver ion-containing compound is blended.

The blending step preferably contains: blending the vanadium-containing compound and an alkaline aqueous solution to prepare a vanadic acid solution (first liquid); blending the strontium ion-containing compound or the calcium ion-containing compound or both thereof, and the titanium ion-containing compound, and preferably the silver ion-containing compound to prepare a liquid containing strontium ions or calcium ions or both thereof, and titanium ions, and preferably silver ions (second liquid); and blending the first liquid and the second liquid.

The alkaline aqueous solution is appropriately selected depending on the intended purpose without any limitation, but the alkaline aqueous solution is preferably a potassium hydroxide aqueous solution.

—Vanadium-Containing Compound—

The vanadium-containing compound is appropriately selected depending on the intended purpose without any limitation, and examples thereof include vanadium chloride, ammonium vanadate, and vanadium pentoxide.

Among them, the vanadium pentoxide is preferable as the vanadium-containing compound, as the disclosed photocatalyst is easily produced in the alkaline environment because of excellent alkali solubility of the vanadium pentoxide, and the vanadium pentoxide is readily available.

—Strontium Ion-Containing Compound—

Examples of the strontium ion-containing compound include strontium hydroxide, and strontium oxoacid. Examples of the strontium oxoacid include strontium nitrate. Examples of the strontium hydroxide include strontium hydroxide octahydrate.

Among them, strontium hydroxide is preferable as the strontium ion-containing compound.

—Calcium Ion-Containing Compound—

Examples of the calcium ion-containing compound include calcium hydroxide, and calcium oxoacid. Examples of the calcium oxoacid include calcium nitrate. Examples of the calcium nitrate include calcium nitric acid anhydride, calcium nitrate tetrahydrate, and calcium nitrate hexahydrate.

Among them, calcium hydroxide, and calcium nitrate are preferable as the calcium ion-containing compound.

—Titanium Ion-Containing Compound—

The titanium ion-containing compound is appropriately selected depending on the intended purpose without any limitation, and examples thereof include titanium oxoacid.

Examples of the titanium oxoacid include titanium sulfate. Examples of the titanium sulfate include a titanium(IV) sulfate solution.

Among them, titanium sulfate is preferable as the titanium ion-containing compound.

—Silver Ion-Containing Compound—

The silver ion-containing compound is appropriately selected depending on the intended purpose without any limitation, and examples thereof include silver oxoacid. Examples of the silver oxoacid include silver nitrate, and silver sulfate.

Among them, silver nitrate is preferable as the silver ion-containing compound.

Use of the silver ion-containing compound can produce a photocatalyst having excellent visible light response.

The blending is preferably carried out in the presence of water. The water is appropriately selected depending on the intended purpose without any limitation, but the water is preferably pure water. Moreover, the water is preferably subjected to a decarbonation treatment.

The blending is preferably carried out in an inert gas atmosphere. The inert gas is appropriately selected depending on the intended purpose without any limitation, and examples thereof include nitrogen gas.

The blending step may be carried out with maintaining the pH of the system to a predetermined range. For example, the blending step is preferably carried out with maintaining pH of the system in a range of 9.0 to 12.0.

A method for maintaining the pH in the predetermined range is appropriately selected depending on the intended purpose without any limitation, and examples thereof include a method containing adding acid or base to the system. The acid is appropriately selected depending on the intended purpose without any limitation. The base is appropriately selected depending on the intended purpose without any limitation, and examples thereof include potassium hydroxide.

<Other Steps>

The aforementioned other steps are appropriately selected depending on the intended purpose without any limitation, and examples thereof include an aging step, a filtering step, a washing step, and a drying step.

—Aging Step—

The aging step is appropriately selected depending on the intended purpose without any limitation, provided that the aging step is a step containing aging, specifically, heating a liquid obtained from the blending step.

Examples of temperature at the time of the heating include 80° C. to 120° C.

A duration of the heating is appropriately selected depending on the intended purpose without any limitation, and examples of the duration include 1 hour to 36 hours.

The heating step is appropriately selected depending on the intended purpose without any limitation, and examples thereof include a method containing heating using a thermostat.

—Filtering Step—

The filtering step is appropriately selected depending on the intended purpose without any limitation, provided that the filtering step is a step containing filtering a liquid obtained after the aging step.

—Washing Step—

The washing step is appropriately selected depending on the intended purpose without any limitation, provided that the washing step is a step containing washing sediments obtained from the filtering step. Examples of the washing step include a step where the sediments are washed with water. Examples of the water include pure water.

—Drying Step—

The drying step is appropriately selected depending on the intended purpose without any limitation, provided that the drying step is a step containing drying a washed produced obtained from the washing step. Examples of the drying step include a step containing drying for 1 hour to 24 hours at 80° C. to 120° C.

According to the disclosed method for producing a photocatalyst, a high performance photocatalyst, which does not contain a metal atom harmful for the environment, and has excellent photocatalystic activities, can be produced.

EXAMPLES

The disclosed photocatalyst, and the disclosed method for producing a photocatalyst are more specifically explained through Examples hereinafter, but Examples shall not be construed as to limit the scope of the disclosed photocatalyst or the disclosed method for producing a photocatalyst, in any way. Note that, in Examples below, "%" denotes "% by mass" unless otherwise stated.

In Examples and Comparative Examples below, amounts of strontium, calcium, titanium, silver, and vanadium were measured by a quantitative analysis using an ICP emission spectrophotometer (ICP-AES).

Example 1

Production of $Sr_9Ti(VO_4)_6(OH)_2$ (Sample 1)

As for a vanadium source, $V_2O_5$ was used. To 100 mL of a potassium hydroxide aqueous solution containing potassium hydroxide (10.100 g), 5.456 g of $V_2O_5$ was added, followed by completely dissolving $V_2O_5$ with stirring, to thereby obtain a vanadic acid solution.

Pure water (800 mL), which had been subjected to a decarbonated treatment, was prepared. In a nitrogen atmosphere, 23.918 g of strontium hydroxide ($Sr(OH)_2 \cdot 8H_2O$) was added to and dissolved in the pure water (about 90° C.). Subsequently, to the obtained liquid, 8.000 g of a 30% titanium sulfate $Ti(SO_4)_2$ aqueous solution was added as a titanium source. The vanadic acid solution was further added to the liquid, followed by stirring, to thereby obtain a sample solution.

The obtained sample solution was placed in a pot formed of tetrafluoroethylene-perfluoroalkyl vinyl ether copolymer (PFA), and was aged for 24 hours in a thermoset of 95° C. After cooling the sample solution to room temperature, the sample solution was subjected to vacuum filtration and washing, followed by drying the resultant for 24 hours at 100° C., to thereby obtain a sample powder (Ti vanadate apatite:$Sr_9Ti(VO_4)_6(OH)_2$).

Figure 3:
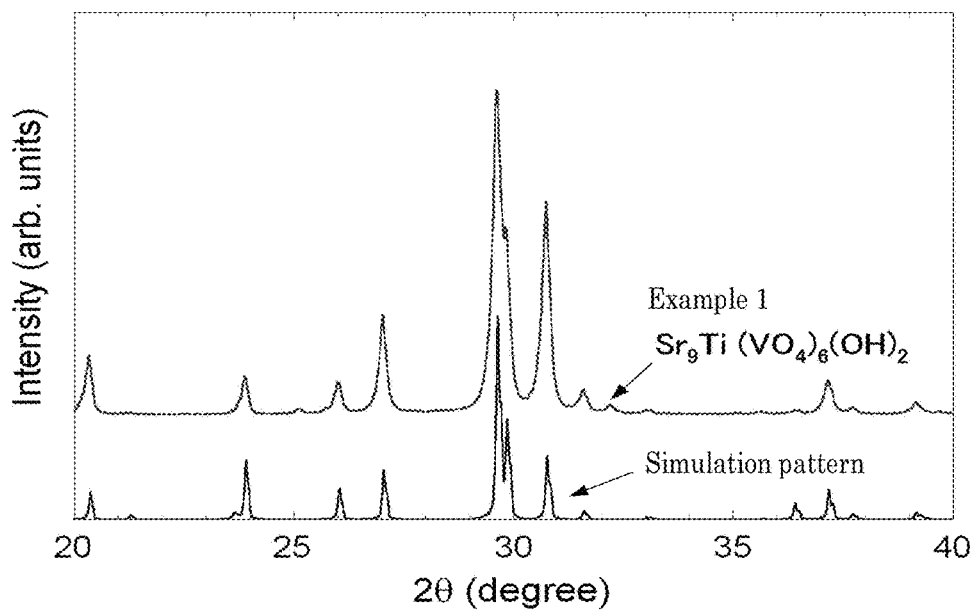
FIG. 3 is a diagram depicting the X-ray diffraction results, and simulation results of the photocatalyst obtained in Example 1.

The obtained Ti vanadate apatite was subjected to a powder X-ray diffraction analysis. The result is depicted in FIG. 3. The simulation result is also depicted in FIG. 3. Moreover, a quantitative analysis was performed using an ICP emission spectrophotometer (ICP-AES). It was confirmed from these results that the obtained Ti vanadate apatite was $Sr_9Ti(VO_4)_6(OH)_2$ (a1=9.0, b1=1.0 in the general formula (1)).

Figure 4:
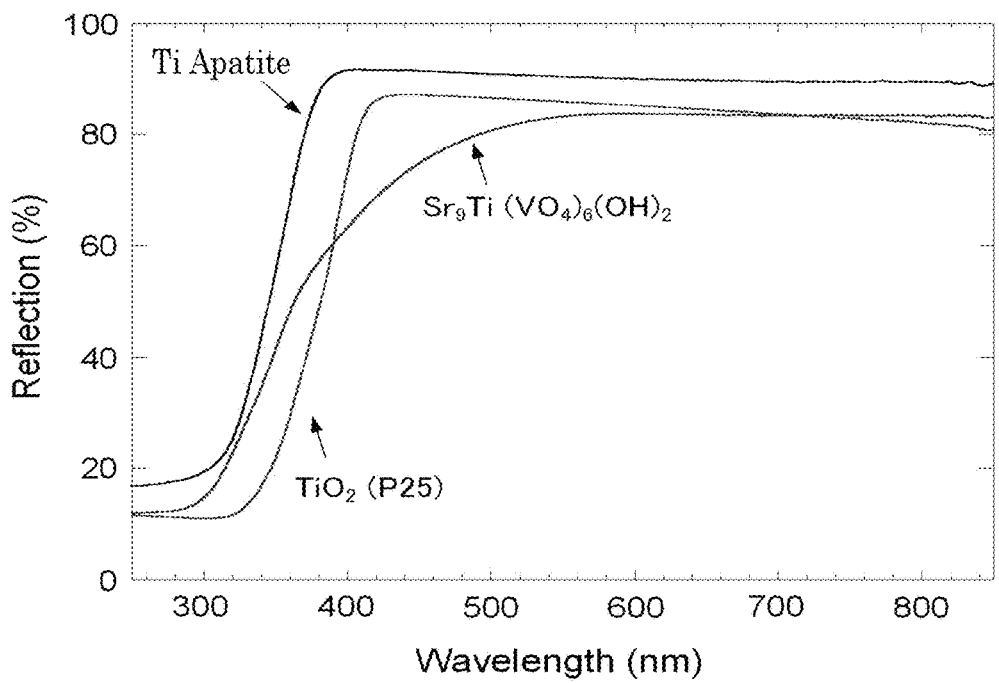
FIG. 4 is a diagram depicting diffuse reflection spectrums of the photocatalyst obtained in Example 1, the photocatalyst obtained in Comparative Example 1, and commercially available titanium oxide.

The diffuse reflection spectrum of the produced Ti vanadate apatite($Sr_9Ti(VO_4)_6(OH)_2$) is depicted in FIG. 4. Note that, in FIG. 4, Ti apatite is calcium-titanium hydroxyapatite of Comparative Example 1 below, and $TiO_2$(P25) is P25 manufactured by NIPPON AEROSIL CO., LTD. The produced Ti vanadate apatite had the reduced reflectance in the visible light region compared to the conventional Ti apatite or titanium oxide, and it was found that the produced Ti vanadate apatite absorbed visible light.

Comparative Example 1

Production of Calcium-Titanium Hydroxyapatite ($Ca_9Ti(PO_4)_6(OH)_2$) (Sample 2)

First, 1 L of pure water, which had been subjected to a decarbonated treatment, was prepared. In a nitrogen atmosphere, the pure water was mixed with 21.25 g of $Ca(NO_3)_2.4H_2O$, and 8.00 g of a 30%-$Ti(SO_4)_2$ aqueous solution, and the resulting mixture was stirred. During this process, pH of the system was maintained at 10.0 with adding 5N—KOH.

Subsequently, to the obtained mixture, 10.45 g of $K_2HPO_4$ was added, followed by adding 5N—KOH to adjust the pH of the system to 12.0, to thereby prepare a suspension liquid.

Subsequently, the obtained suspension liquid was aged for 24 hours at 100° C., followed by filtering the suspension liquid, in which precipitation had been caused, through suction filtration. The separated sediments were washed with 2 L of pure water, and then dried for 12 hours in a dry oven of 100° C. Thereafter, the resultant was pulverized by a mortar, to thereby obtain calcium-titanium hydroxyapatite ($Ca_9Ti(PO_4)_6(OH)_2$) (Sample 2).

Example 2

Production of $Sr_8TiAg(VO_4)_6(OH)_2$ (Sample 3)

As for a vanadium source, $V_2O_5$ was used. To 100 mL of a potassium hydroxide aqueous solution containing potassium hydroxide (10.100 g), 5.456 g of $V_2O_5$ was added, followed by completely dissolving $V_2O_5$ with stirring, to thereby obtain a vanadic acid solution.

Pure water (800 mL), which had been subjected to a decarbonated treatment, was prepared. In a nitrogen atmosphere, 21.261 g of strontium hydroxide ($Sr(OH)_2.8H_2O$) was added to and dissolved in the pure water (about 90° C.). Subsequently, to the obtained liquid, 1.699 g of silver nitrate, and as a titanium source, 8.000 g of a 30% titanium sulfate $Ti(SO_4)_2$ aqueous solution were added. The vanadic acid solution was further added to the liquid, followed by stirring, to thereby obtain a sample solution.

The obtained sample solution was placed in a pot formed of tetrafluoroethylene-perfluoroalkyl vinyl ether copolymer (PFA), and was aged for 24 hours in a thermoset of 95° C. After cooling the sample solution to room temperature, the sample solution was subjected to vacuum filtration and washing, followed by drying the resultant for 24 hours at 100° C., to thereby obtain a sample powder ($Sr_8TiAg(VO_4)_6(OH)_2$).

A powder X-ray diffraction analysis and quantitative analysis using an ICP emission spectrophotometer (ICP-AES) were performed in the same manner as in Example 1. As a result, it was confirmed that obtained was $Sr_8TiAg(VO_4)_6(OH)_2$ (a2=8.0, b2=1.0, c2=1.0 in the general formula (1)).

Example 3

Production of $Ca_9Ti(VO_4)_6(OH)_2$ (Sample 4)

As for a vanadium source, $V_2O_5$ was used. To 100 mL of a potassium hydroxide aqueous solution containing potassium hydroxide (10.100 g), 5.456 g of $V_2O_5$ was added, followed by completely dissolving $V_2O_5$ with stirring, to thereby obtain a vanadic acid solution.

Pure water (800 mL), which had been subjected to a decarbonated treatment, was prepared. In a nitrogen atmosphere, 21.253 g of $Ca(NO_3)_2.4H_2O$ was added to and dissolved in the pure water. Subsequently, to the obtained liquid, 8.000 g of a 30% titanium sulfate $Ti(SO_4)_2$ aqueous solution was added as a titanium source. The vanadic acid solution was further added to the liquid, followed by stirring, to thereby obtain a sample solution. During this process, pH of the system was maintained at 12.0 with adding 5N—KOH.

The obtained sample solution was placed in a pot formed of tetrafluoroethylene-perfluoroalkyl vinyl ether copolymer (PFA), and was aged for 24 hours in a thermoset of 95° C. After cooling the sample solution to room temperature, the sample solution was subjected to vacuum filtration and washing, followed by drying the resultant for 24 hours at 100° C., to thereby obtain a sample powder ($Ca_9Ti(VO_4)_6(OH)_2$).

A powder X-ray diffraction analysis and quantitative analysis using an ICP emission spectrophotometer (ICP-AES) were performed in the same manner as in Example 1. As a result, it was confirmed that obtained was $Ca_9Ti(VO_4)_6(OH)_2$ (a1=9.0, b1=1.0 in the general formula (1)).

Example 4

Production of $Ca_8TiAg(VO_4)_6(OH)_2$ (Sample 5)

As for a vanadium source, $V_2O_5$ was used. To 100 mL of a potassium hydroxide aqueous solution containing potassium hydroxide (10.100 g), 5.456 g of $V_2O_5$ was added, followed by completely dissolving $V_2O_5$ with stirring, to thereby obtain a vanadic acid solution.

Pure water (800 mL), which had been subjected to a decarbonated treatment, was prepared. In a nitrogen atmosphere, 5.927 g of $Ca(OH)_2$ was added to and dissolved in the pure water. Subsequently, to the obtained liquid, 1.699 g of silver nitrate, and as a titanium source, 8.000 g of a 30% titanium sulfate $Ti(SO_4)_2$ aqueous solution. The vanadic acid solution was further added to the liquid, followed by stirring, to thereby obtain a sample solution.

The obtained sample solution was placed in a pot formed of tetrafluoroethylene-perfluoroalkyl vinyl ether copolymer (PFA), and was aged for 24 hours in a thermoset of 95° C. After cooling the sample solution to room temperature, the sample solution was subjected to vacuum filtration and washing, followed by drying the resultant for 24 hours at 100° C., to thereby obtain a sample powder ($Ca_8TiAg(VO_4)_6(OH)_2$).

A powder X-ray diffraction analysis and quantitative analysis using an ICP emission spectrophotometer (ICP-AES) were performed in the same manner as in Example 1. As a result, it was confirmed that obtained was $Ca_8TiAg(VO_4)_6(OH)_2$ (a2=8.0, b2=1.0, c2=1.0 in the general formula (1)).

<Evaluation>
—Evaluation of Photocatalystic Activities (Decomposition of Acetaldehyde Gas)—

Sample 1 ($Sr_9Ti(VO_4)_6(OH)_2$) obtained in Example 1, Sample 2 ($Ca_9Ti(PO_4)_6(OH)_2$) obtained in Comparative Example 1, and Sample 4 ($Ca_9Ti(VO_4)_6(OH)_2$) obtained in Example 3 were subjected to the evaluation of photocatalystic activities (decomposition of acetaldehyde gas).

First, the powder of each sample was weighted so that a surface area thereof based upon a result of a specific surface area measurement was to be 100 m². Then, the weighted sample was uniformly placed on a bottom surface of a container (volume: 500 cm³) with a lid formed of quartz glass, and an inner atmosphere of the container was replaced with synthetic air (20% by volume of oxygen-80% by volume of nitrogen).

Next, acetaldehyde was injected inside the container so that the concentration of the acetaldehyde gas was to be 1% by volume, and the resultant was left to stand for 1 hour in dark until the acetaldehyde gas reached adsorption equilibrium with the sample powder.

Thereafter, the below-described predetermined light exposure was started (after 1 hour from the standstill in darkness), and the gas inside the container was taken out by a syringe 1 hour later from the start of the light exposure (after 2 hours from the standstill in darkness), 2 hours later (after 3 hours from the standstill in darkness), and 3 hours later (after 4 hours from the standstill in darkness). The concentration of the $CO_2$ gas in the taken gas was measured by means of a gas chromatography (GC-390B, manufactured by GL Sciences Inc.).

[Light]

As for a light source for applying light, a xenon lamp (LA-251Xe, manufactured by HAYASHI WATCH-WORKS, 150 W, light intensity: 1 mW/cm²) was used.

Figure 5:
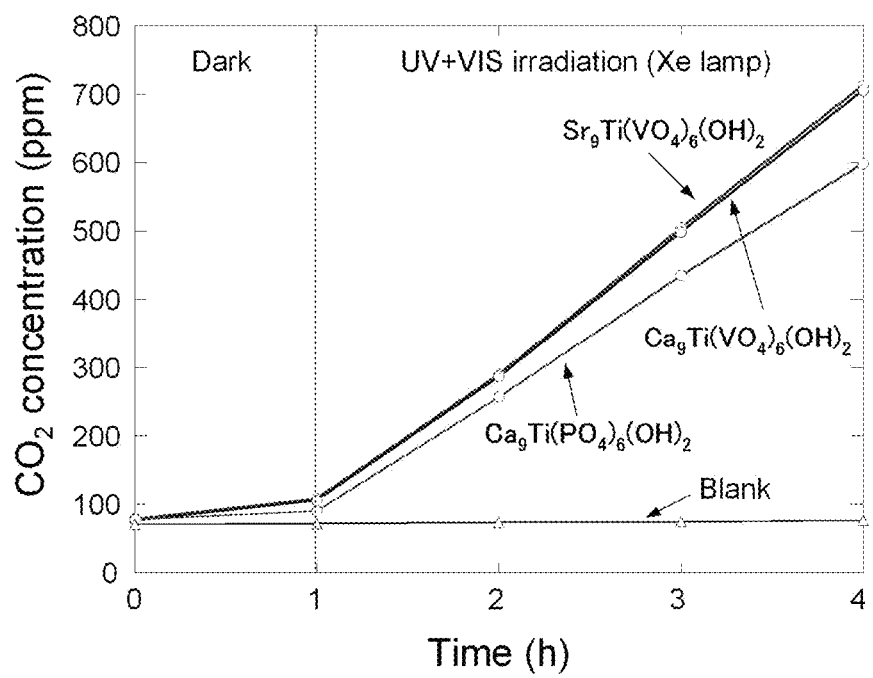
FIG. 5 is a diagram depicting the results of the decomposition test of acetaldehyde gas.

The change in the concentration of $CO_2$ is depicted in FIG. 5.

In FIG. 5, "Blank" is a result of the (blank) test, in which no sample was added inside the container. When Sample 1 ($Sr_9Ti(VO_4)_6(OH)_2$) of Example 1, and Sample 4 ($Ca_9Ti(VO_4)_6(OH)_2$) of Example 3 were used, generation of $CO_2$ was confirmed from the start of light exposure, and the concentration of $CO_2$ increased with time. When Sample 1 of Example 1 and Sample 4 of Example 3 were used, the increase in the concentration of $CO_2$ was larger than the increase in the concentration of $CO_2$ when Sample 2($Ca_9Ti(PO_4)_6(OH)_2$) of Comparative Example 1 was used. Accordingly, it was confirmed that Sample 1 of Example 1 and Sample 4 of Example 3 were responsive to light of the wider wavelength range than Sample 2 of Comparative Example 1.

—Evaluation of Photocatalytic Activities (Decomposition of Methylene Blue) with Visible Light—

First, the powder of each sample was weighted in a dish having a diameter of 75 mm so that a surface area thereof based upon a result of a specific surface area measurement was to be 105 m². Then, 30 mL of a 0.001 mmol/L methylene blue aqueous solution was added to the dish. Under negative conditions, the resultant was left to stand for 1 hour to sufficiently adsorb the methylene blue on the sample. Thereafter, the methylene blue aqueous solution was removed. Then, 30 mL of a fresh 0.001 mmol/L methylene blue aqueous solution was added to the dish.

Thereafter, a xenon lamp (LA-251Xe, manufactured by HAYASHI WATCH-WORKS, 150 W), from light of which light having a wavelength of 420 nm or shorter was cut by a band pass filer (L-42, manufactured by AGC TECHNO GLASS CO., LTD.), was set in a position that was 20 cm upwards from the dish, and light was applied to the dish by the xenon lamp for 5 hours. Note that, the illuminance during light exposure was set to 35,000 lux on a liquid surface of the methylene blue aqueous solution.

Figure 6:
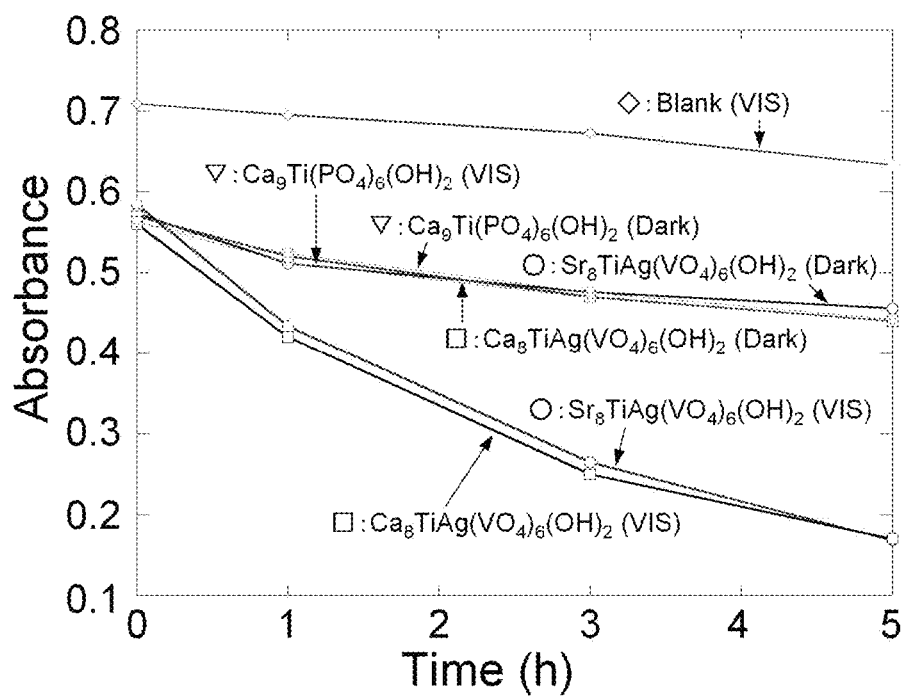
FIG. 6 is a diagram depicting the results of the decomposition test of methylene blue.

FIG. 6 depicts a change in the absorbance of the methylene blue aqueous solution with time, when decomposition of methylene blue is evaluated using each sample of Example 2, Example 4, and Comparative Example 1.

In FIG. 6, "Blank(VIS)" means that no methylene blue aqueous solution is added to the sample, i.e., blank; "VIS" is a result under light conditions; and "Dark" is a result under dark conditions.

When Sample 2 ($Ca_9Ti(PO_4)_6(OH)_2$) of Comparative Example 1 was used, reduction in the absorption, which was assumed due to adsorption, was seen, but the change in the absorption with time was the same between under the light conditions and under the dark conditions. Accordingly, it was found that decomposition of methylene blue hardly occurred.

When Sample 3 ($Sr_8TiAg(VO_4)_6(OH)_2$) of Example 2, and Sample 5 ($Ca_8TiAg(VO_4)_6(OH)_2$) of Example 4 were used, on the other hand, the absorption was reduced with time under the light conditions compared to the absorption under the dark conditions. Accordingly, it was found that the methylene blue was decomposed.

Therefore, it was confirmed that Sample 3 of Example 2 and Sample 5 of Example 4 were responsive to visible light.

All examples and conditional language provided herein are intended for pedagogical purposes to aid the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A photocatalyst, represented by the following general formula (1):

$$X(VO_4)_6(OH)_2 \qquad \text{General Formula (1)}$$

wherein X represents $Z_{a2}Ti_{b2}Ag_{c2}$ (where Z is Sr; a2 is 7.0 to 9.5; b2 is 0.4 to 1.5; c2 is 0.1 to 2.0; and a2+b2+c2 is 9.0 to 10.0) in the general formula (1).

2. A method for producing the photocatalyst according to claim 1, the method comprising:

blending a vanadium-containing compound, a strontium ion-containing compound, a titanium ion-containing compound, and a silver ion-containing compound together.

3. The method according to claim 2, wherein the vanadium-containing compound is vanadium pentoxide.

* * * * *